(12) United States Patent
Dureiko

(10) Patent No.: US 6,336,270 B1
(45) Date of Patent: *Jan. 8, 2002

(54) TUBE CUTTING AND PREPARATION TOOL AND METHOD

(75) Inventor: Dan R. Dureiko, Cleveland Heights, OH (US)

(73) Assignee: Emerson Electric Co., St. Louis, MO (US)

(*) Notice: Subject to any disclaimer, the term of this patent is extended or adjusted under 35 U.S.C. 154(b) by 0 days.

This patent is subject to a terminal disclaimer.

(21) Appl. No.: 09/670,322

(22) Filed: Sep. 27, 2000

Related U.S. Application Data

(62) Division of application No. 09/238,193, filed on Jan. 27, 1999, now Pat. No. 6,189,216.
(60) Provisional application No. 60/072,633, filed on Jan. 27, 1998.

(51) Int. Cl.[7] .............................................. B23D 21/08
(52) U.S. Cl. ............................................. 30/102; 30/97
(58) Field of Search .............................. 30/93, 94, 95, 30/96, 97, 101, 102

(56) References Cited

U.S. PATENT DOCUMENTS

| | | | |
|---|---|---|---|
| 2,195,568 A | | 4/1940 | Hexdall |
| 2,563,483 A | * | 8/1951 | O'Hagan ..................... 30/102 |
| 2,753,744 A | | 7/1956 | Therien |
| 3,370,352 A | | 2/1968 | Steely |
| 3,974,562 A | * | 8/1976 | Wuchner ....................... 30/97 |
| 4,305,205 A | * | 12/1981 | Girala ........................ 30/102 |
| 4,769,911 A | | 9/1988 | Araki |
| 4,890,385 A | | 1/1990 | VanderPol et al. |
| 4,953,292 A | | 9/1990 | Tobey |
| 5,103,699 A | | 4/1992 | Brown |
| 5,243,760 A | | 9/1993 | May, Jr. |
| 5,307,534 A | | 5/1994 | Miller |
| 5,315,759 A | | 5/1994 | Mashata |
| 5,493,748 A | | 2/1996 | Santo |
| 5,495,672 A | | 3/1996 | Kritchever et al. |
| 5,528,830 A | | 6/1996 | Hansen |
| 5,829,142 A | * | 11/1998 | Rieser ........................... 30/93 |
| 5,943,778 A | * | 8/1999 | Alana .......................... 30/102 |
| 6,014,810 A | * | 1/2000 | Earle et al. .................... 30/102 |
| 6,189,216 B1 | * | 2/2001 | Dureiko ....................... 30/102 |

* cited by examiner

Primary Examiner—Hwei-Siu Payer
(74) Attorney, Agent, or Firm—Vickers, Daniels & Young

(57) ABSTRACT

A portable battery operated tube electrical conduit processing tool is disclosed. The tool has a housing includes a body portion and a handle portion connected in transverse relationship. A battery is connected to the handle portion. A motor is carried by the body portion and a switch controlled circuit connects the battery to the motor. The body portion delineates a work station with a station access opening. A motor driven workpiece drive is mounted adjacent the station. A gear train drivingly interconnects the motor and the drive whereby a workpiece may be drivingly rotated on actuation of the switch to energize the motor. A cutter support and cutter are movingly carried by the body portion. A manually actuatable trigger mechanism is operably connected to the switch and the support for actuating the switch to energize the motor and for pressing the cutter against a workpiece. The gear train further includes an accessory drive shaft for driving burnishing brushes and a disclosed novel reamer.

17 Claims, 4 Drawing Sheets

TUBE CUTTING AND PREPARATION TOOL AND METHOD

This patent application is a continuation of application Ser. No. 09/238,193, filed on Jan. 27, 1999 now U.S. Pat. No. 6,189,216 which claims benefit of U.S. provisional application Serial No. 60/072,633, filed Jan. 27, 1998, and incorporated herein by reference.

This invention relates to a hand held, battery operated tool for cutting copper tubing and electrical conduit and for preparing such conduit and copper tubes and fittings for connection.

BACKGROUND OF THE INVENTION

Plumbers and electricians must cut tubing to provide lengths suitable for use in installing plumbing systems and electrical conduits. While there have been powered cutters for many years, commercially available machines can hardly be considered to be portable. Proposals for hand held tools have had shortcomings that presumably resulted in a lack of commercialization. As a consequence, tubing and conduits are typically cut at a job site by a tradesman using a manually operated cutter. In many cases, a freshly cut tube is reamed to remove inwardly directed flashing that results from the cutting operation. As with tube cutting, the reaming operation is typically performed manually.

When a copper plumbing system is being installed it is necessary to burnish the outside diameter of tubing and the inside diameter of fittings in order that solder of a sweat joint will firmly and properly adhere to each tube and fitting being joined.

Since the described and other steps in preparing plumbing and electrical components for installation had been performed manually, there is need for a cordless, hand held, power operated tool for performing such cutting and burnishing operations.

SUMMARY OF THE INVENTION

The present invention provides a portable, hand held, battery operated tool for cutting copper tubing and electrical conduit. The tool preferably includes a power operated shaft for removably receiving deburring tools and brushes for preparing tubing ends and fittings to be secured together by sweat joints.

DETAILED DESCRIPTION OF THE PREFERRED EMBODIMENT

Figure 1:
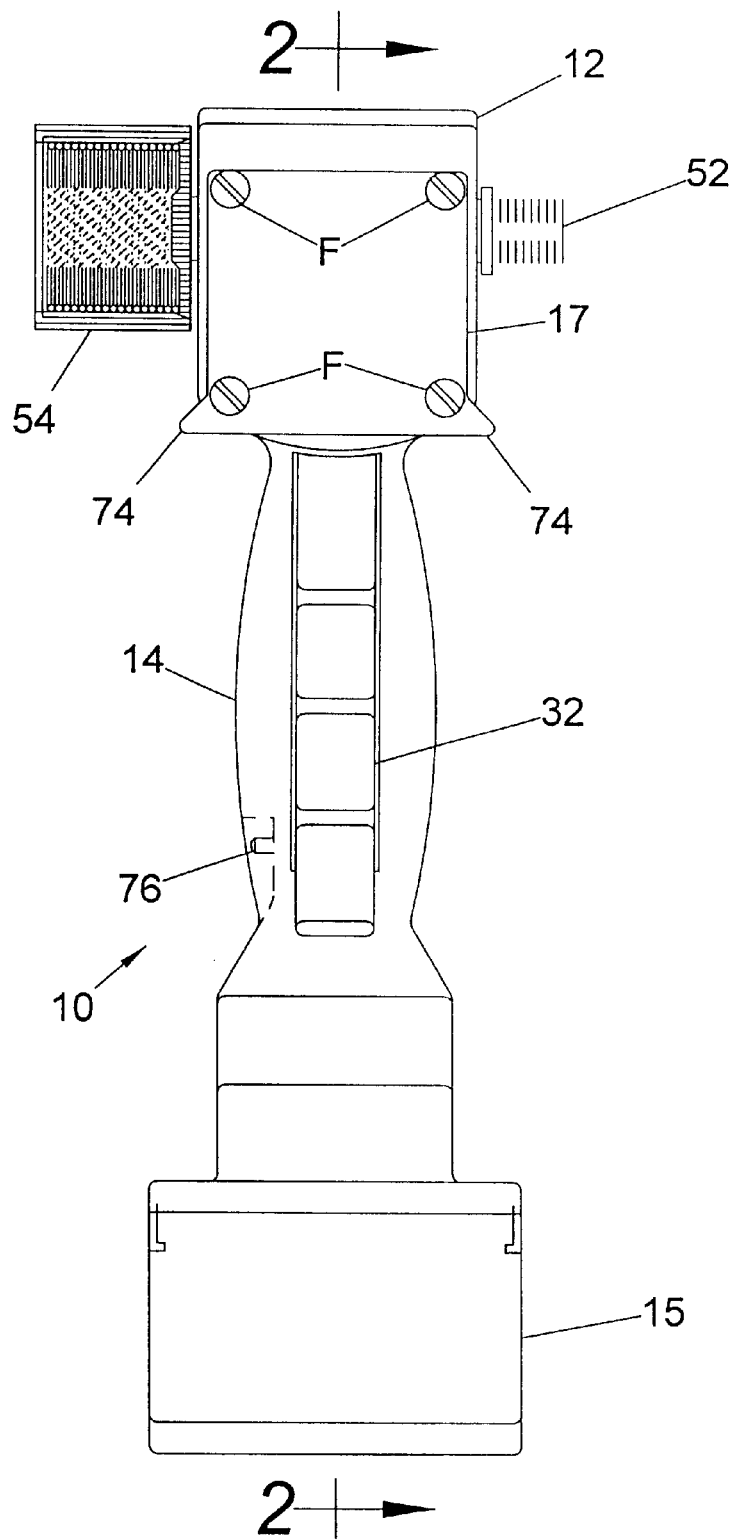
FIG. 1 is an elevational view of the tool of the present invention.

Referring to the drawings, the hand held, battery operated tool of the present invention is shown generally at 10. The tool 10 includes a housing having a main body 12 and a depending handle 14. A battery 15 is secured to the base of the handle 14. A motor 16 is mounted in a forward, removable extension 17 of the body 12 and electrically connected to the battery through conductors 21, FIG. 2. An on/off switch 18 is connected in the battery—motor circuit for control of the motor, FIG. 2.

Figure 2:
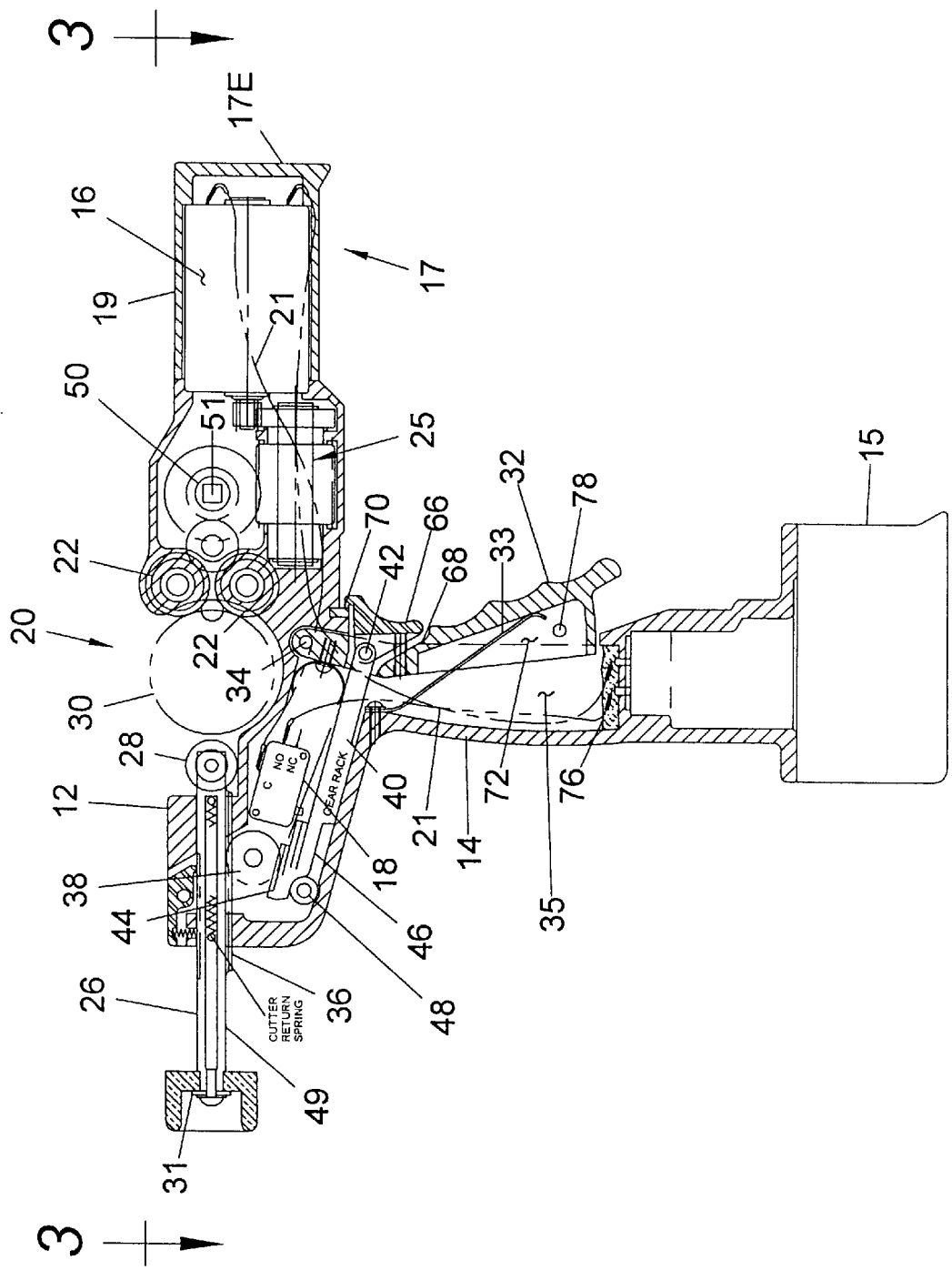
FIG. 2 is a sectional view as seen from the plane indicated by the line 2—2 of FIG. 1.
Figure 3:
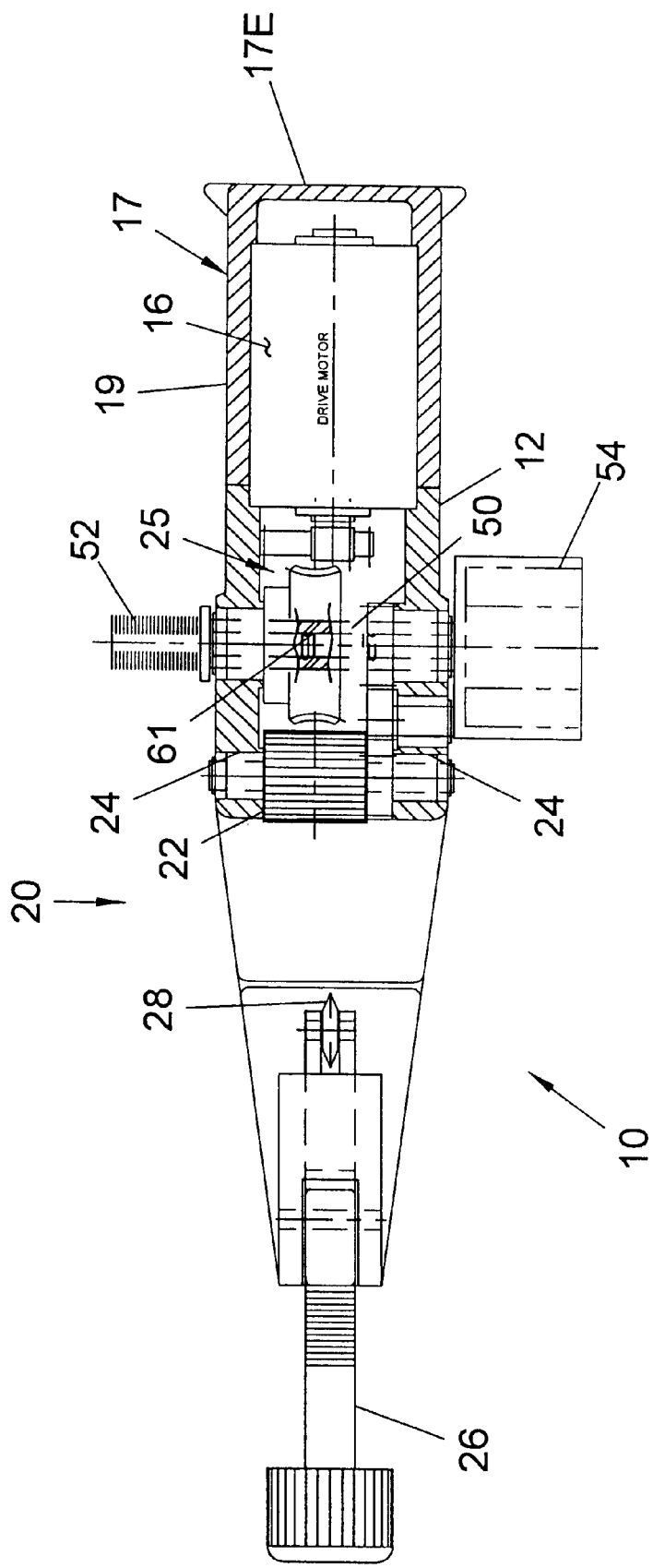
FIG. 3 is a partially sectioned view of the tool as seen from the plane indicated by the lines 3—3 of FIG. 2.

The extension 17 includes a body portion 19 which surrounds the motor 16, FIGS. 2 and 3. The extension 17 has a closed outer end 17E and an opposite open end communicating with a space within the body 12. Fasteners F removably secure the extension 17 to the body 12, FIG. 1.

The body 12 delineates an open top work station 20. A pair of driven rolls 22 are rotatively journaled in the body 12. Journaling of the upper one of the rolls 22 is shown at 24 in FIG. 3. A gear train 25 drivingly interconnects the motor and the driven rolls 22.

A cutter support 26 is reciprocatably mounted at a rearward end of the body 12. A cutter wheel 28 is rotatively mounted on a forward end of the support 26 for selective movement into the work station 20 for engagement with a workpiece shown in phantom at 30 in FIG. 2. A spare cutter wheel 31 is removably secured to the rearward end of the support 26.

A cutting trigger 32 is pivotally mounted near the junction of the body and handle 12,14 by a pivot 34. The cutting trigger 32 is selectively movable into a space 35 in the handle portion 14 against the action of trigger spring 33. A cavity 72 in cutting trigger 32 allows movement of the trigger spring 33. The trigger 32 is an elongate member contoured to be ergonomically gripped by the fingers of an operator. Operation of the trigger for a cutting operation can be likened to the operation of a caulking gun.

The cutter support 26 includes a set of rack teeth 36 formed in its underside. A pinion 38 is rotatively mounted in the body 12. The pinion 38 drivingly engages the holder rack teeth 36. A drive link 40 is pivotally connected to the trigger 32 at 42. The drive link 40 has upwardly directed rack teeth 44. The drive link also has an underside cam surface 46. The cam surface 46 is in engagement with a roller cam 48 rotatably mounted in the body portion.

When the trigger is depressed the drive link 40 is shifted to the left as viewed in FIG. 2 and is cammed upwardly by the roller cam 48. Once cammed upwardly, the drive link closes the switch 18 to energize the motor 16. The upward camming of the drive link brings its rack teeth 44 into driving engagement with the pinion 38. Further depression of the trigger causes the pinion to rotate and drive the cutter support 26 forwardly to bring the cutter wheel 28 into compressive cutting engagement with a workpiece 30. The engagement of the workpiece by the cutter wheel forces the workpiece into driven engagement with the drive rolls 22. The cutter support has a space 49 to the left, as viewed in FIG. 2, of the rack teeth 44 limiting the length of the rack to prevent the cutter 28 from being driven into the drive rolls 22 in the absence of a workpiece.

A driven cross shaft 50 is provided. The cross shaft includes a bore 51 which has spaced end portions that are square in cross section, FIG. 2. These end portions each may be likened to the aperture in a mechanics' socket. In the disclosed and preferred embodiment, the cross shaft 50 is connected to the gear train 25 such that whenever the motor 16 is operated both the driven wheels 22 and the cross shaft rotate.

As pictured in FIGS. 1 and 3 an inside diameter brush 52 is removably connected to the cross shaft 50 at the upper side as viewed in FIG. 3. At the lower side an outside diameter brush 54 is removably mounted. A reaming cutter 56, FIG. 5, for removing internal burs from the cut end of a tube may be selectively connected to the driven cross shaft 50.

Figure 5:
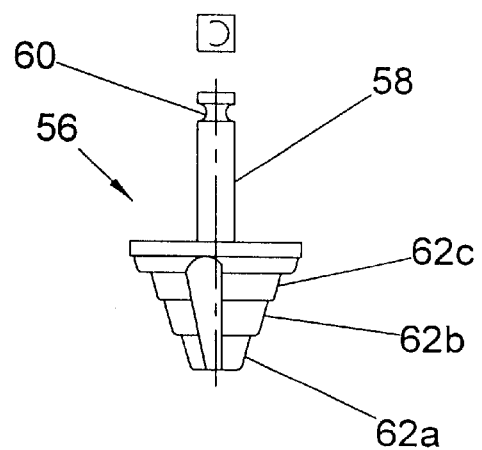

The connection of the removable brushes 52,54 and the reamer 56 to the cross shaft 50 is best understood by reference to FIGS. 3 and 5. As seen in FIG. 5, the reamer has an elongate square stem 58. The stem has an O-ring groove 60 formed near the end of the stem remote from cutter teeth 62*a–c*. As can be seen by an examination of FIG. 3, the removable brushes and reamer are connected to the cross shaft 50 by inserting the stem 58 into a square bore 51 in the cross shaft. An O-ring in the groove 60 provides retention of a removable brush or reamer stem in the cross shaft bore by compressive engagement with a cylindrical section 61 of the bore 51, FIG. 3. The square stem coacts with the square end portions of the bore 5 1 to provide a driving interconnection between the removable brush or reamer and the cross shaft.

The reamer cutting teeth 62*a–c* provide one of the outstanding features of the invention. The teeth are in a stepped construction with, for example, the teeth 62*a* sized to ream ½ inch tubes, the teeth 62*b* sized for ¾ inch tubes and the teeth 62*c* sized for 1 inch tubes.

In order to prevent accidental energization of the motor when the unit is not in use, a trigger lock and release 66 is provided. The trigger release 66 is pivotally mounted on the pivot 42. The trigger release 66 is biased into a locked position by a spring biased trigger plunger 68, such that coacting locking surfaces at 70 are engaged. When the motor is to be energized the trigger release 66 is depressed enabling depression of the trigger 32.

Figure 4:
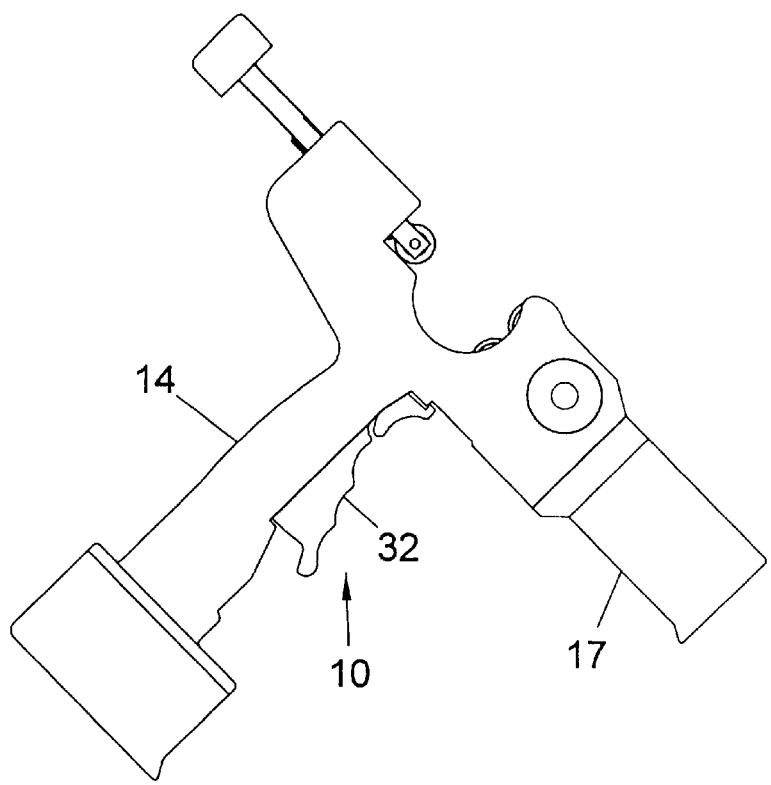
FIG. 4 is an elevational view of the tool on a reduced scale showing the tool in a supported position; and, FIG. 5 is plan view of a reamer for use with the tool.

Ear extensions 74, FIGS. 1 and 4, on the end section 17 are provided to stabilize the tool 10 when in the supported position of FIG. 4. A mechanism is preferably provided for locking the trigger in its on position. The disclosed locking mechanism as shown in FIGS. 1 and 2 has a spring biased trigger locking pin 76. The locking pin may selectively be depressed to insert an end portion of it into a trigger aperture 78 to lock the trigger in an on position.

Operation

When an operator wishes to produce a workpiece from a tube which may be either copper tubing or electrical conduit, he first measures the tube and marks the location where a cut is to be made. Next, the tube is inserted into the work station as indicated at 30 in FIG. 2. The marked location is then aligned with the cutter 28. Next the trigger release 42 is depressed to place it in the release position and allow the trigger 32 to be depressed into the handle space 35. Depression of the trigger 32 causes the drive link 40 to shift to the left as viewed in FIG. 2. Coaction of the cam surface 46 and the roller cam 48 causes the rack teeth 44 to engage the pinion 38. Concurrently, the switch 18 is turned into its "on" position to energize the motor 16.

As the trigger is further depressed, the cutter support 26 moves to the right as viewed in FIG. 2, bringing the cutter 28 into engagement with the tube 30 and the force of that engagement in turn establishes a driven relationship between the tube and the drive rolls 22. The drive rolls rotate the workpiece as the cutter is pressed against it to severe the workpiece from the balance of the tube being cut.

Once the workpiece has been cut, the trigger is released. Once closing pressure is removed from the trigger, the trigger spring 33 returns the trigger to its "off" position and concurrently the trigger plunger 38 returns the trigger lock and release 66 to its locked position.

If internal flashing on the cut end of the workpiece is to be removed, a reaming operation is now performed. To that end a reamer 56 is inserted into the aperture of the drive cross shaft 50. The tool is placed in the support position of FIG. 4, the trigger is again moved to its "on" position and the trigger locking pin 76 is depressed to insert it into the trigger aperture 78. On release of manual pressure from the trigger release, friction between the walls defining the aperture 78 and the trigger pin 76 will maintain the pin 76 in the aperture to hold the trigger in the "on" position. Assuming the workpiece is a ⅜" diameter tube, the end to be reamed will be axially aligned with the reamer and pressed axially toward the reamer to engage the teeth 62*b* to remove any flashing that resulted from the cutting operation.

When the workpiece is a copper tube, it is inserted into an outside diameter brush 54 of the appropriate diameter to burnish a small end section preparatory to the formation of a sweat joint. The operator will also burnish the sweat joint surfaces of a fitting by inserting an appropriately sized inside diameter brush 52 into the fitting.

When performing the reaming or burnishing operation, an operator will use one hand to steady the tool in its supported position while positioning fittings and workpieces relative to the brushes and reamer with the other hand to effect the reaming and burnishing operations.

Although the invention has been described in its preferred form with a certain degree of particularity, it is understood that the present disclosure of the preferred form has been made only by way of example and that numerous changes in the details of construction, operation and the combination and arrangement of parts may be resorted to without departing from the spirit and the scope of the invention as hereinafter claimed.

What is claimed is:

1. A portable tube processing apparatus comprising:
   a. a housing including handle and body portions, the body portion being connected to an end of the handle portion in transverse relationship;
   b. the housing connectable to a source of electrical power;
   c. a motor carried by the body portion and a circuit operably connecting the source of electrical power to the motor;
   d. the circuit including a switch carried by the housing;
   e. the body portion delineating a work station with a station access opening;
   f. a workpiece drive mounted adjacent the station;
   g. a gear train drivingly interconnecting the motor and the drive whereby a workpiece may be drivingly rotated on actuation of the switch to energize the motor;
   h. a cutter support movingly carried by the body portion;
   i. a cutter carried by the support at a position near the station;
   j. a manually actuatable trigger mechanism operably connected to the switch and the support for actuating the switch to energize the motor and for pressing the cutter against a workpiece; and,
   k. the support and the motor being on opposite sides of the station whereby to provide a balanced tool.

2. The apparatus of claim 1, wherein the source of electrical power is a battery.

3. The apparatus of claim 1, wherein the gear train further includes an accessory drive shaft.

4. The apparatus of claim 3, further including a brush operably connected to the shaft.

5. The apparatus of claim 3, further including a reamer operably connected to the shaft.

6. The apparatus of claim 5, wherein the reamer is of stepped construction with a plurality of teeth sets, the teeth of one set being sized to ream tubing of a size different than the teeth of another set are sized to ream.

7. A tube preparation device for use by plumbers and electricians comprising:

a. a housing including transversely oriented handle and body portions;
b. a motor mounted in the body portion;
c. a source of electrical power being operably connected to the motor through a circuit including an on/off switch;
d. the body portion including structure delineating an externally accessible work space;
e. a workpiece drive journaled adjacent the space and drivingly connected to the motor;
f. a cutter support movably mounted on the body portion, the support being moveable from a storage position toward the space into a cutting position and return;
g. a cutting trigger movably carried by the handle portion; and,
h. a linkage operably connecting the cutting trigger to the cutter support and to the switch whereby on movement of the cutting trigger from a cutting handle storage position the switch is actuated to energize the motor and the cutter support is moved from its storage position toward the space.

8. The device of claim 7, wherein the source of electrical power is a battery.

9. The device of claim 7, wherein a gear train operably connects the motor to the workpiece drive.

10. The device of claim 9, wherein the gear train includes an accessory drive.

11. The device of claim 10, wherein brushes and reamers are selectively, removably and operably connectable to the accessory drive.

12. The device of claim 7, wherein the linkage includes an elongate element having a cam surface and a roller cam engages the cam surface.

13. A tube cutting apparatus comprising:
   a. a housing including a handle portion and a body portion defining a cutting station, the body portion having a cutting station access aperture;
   b. an electric motor at least partially disposed within the housing;
   c. a cutter support movably carried by the housing;
   d. a cutter carried by the support and movably with the support toward and away from a workpiece when such workpiece is positioned in the station;
   e. drive wheels rotatably mounted adjacent the station for rotatively driving a workpiece when the apparatus is in use;
   f. gearing drivingly interconnecting the motor and the drive wheels;
   g. the housing connectable to a source of electrical power;
   h. circuitry including a motor control switch for selectively actuating the motor, the circuitry being connected to the source of electrical power and the motor;
   i. a trigger mechanism movably carried by the handle portion, the trigger mechanism being movable between storage and on positions, the mechanism being positioned to close the switch when in the on position and including structure for driving the support toward the station to bring the cutter into engagement with a workpiece in the station.

14. The apparatus of claim 13, wherein the trigger mechanism includes a spring biased lock for maintaining the mechanism in its storage position until manually released.

15. The apparatus of claim 14, wherein the trigger mechanism includes a further spring biased lock for maintaining the mechanism in an on position.

16. The apparatus of claim 13, wherein the trigger mechanism includes a trigger and a cutter handle.

17. The apparatus of claim 13, wherein the trigger mechanism includes a spring biased lock for maintaining the mechanism in an on position.

* * * * *